United States Patent
Luk et al.

(10) Patent No.: US 9,769,170 B2
(45) Date of Patent: Sep. 19, 2017

(54) SYNCHRONIZING CREDENTIAL HASHES BETWEEN DIRECTORY SERVICES

(71) Applicant: Microsoft Technology Licensing, LLC, Redmond, WA (US)

(72) Inventors: Jonathan M. Luk, Bellevue, WA (US); Ariel N. Gordon, Kirkland, WA (US); Raman N. Chikkamagalur, Sammamish, WA (US); Ziad Elmalki, Redmond, WA (US); Sergii Gubenko, Sammamish, WA (US); Girish Chander, Redmond, WA (US); Anandhi Somasekaran, Redmond, WA (US); Murli D. Satagopan, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/042,143

(22) Filed: Feb. 11, 2016

(65) Prior Publication Data

US 2016/0301694 A1 Oct. 13, 2016

Related U.S. Application Data

(63) Continuation of application No. 13/873,882, filed on Apr. 30, 2013, now Pat. No. 9,282,093.

(51) Int. Cl.
*H04L 29/06* (2006.01)
*G06F 21/31* (2013.01)
(Continued)

(52) U.S. Cl.
CPC .......... *H04L 63/0876* (2013.01); *G06F 21/31* (2013.01); *H04L 9/0891* (2013.01);
(Continued)

(58) Field of Classification Search
CPC ... G06F 21/31; H04L 2209/38; H04L 9/0891; H04L 9/3226
(Continued)

(56) References Cited

U.S. PATENT DOCUMENTS 6,240,184 B1 * 5/2001 Huynh ................. G06F 21/31
380/206
6,615,383 B1 * 9/2003 Talluri ................. H04L 1/1614
714/749
(Continued)

FOREIGN PATENT DOCUMENTS

| | | |
|---|---|---|
| CN | 1400835 A | 4/2003 |
| EP | 1429228 A2 | 6/2004 |
| WO | 2014179386 A1 | 11/2014 |

OTHER PUBLICATIONS

Lamport, Leslie, "Password Authentication with Insecure Communication", In Communications of the ACM, vol. 24, Issue 11, Nov. 1981, pp. 770-772.
(Continued)

*Primary Examiner* — Samson Lemma
(74) *Attorney, Agent, or Firm* — Harness, Dickey & Pierce, P.L.C.

(57) ABSTRACT

The subject disclosure is directed towards securely synchronizing passwords that are changed at a source location (e.g., an on-premises directory service) to a target location (e.g., a cloud directory service), so that the same credentials may be used to log into the source or target location, yet without necessarily having each domain controller handle the synchronization. The plaintext password is not revealed, instead using hash values computed therefrom to represent the password-related data. The target may receive a secondary hash of a primary hash, and thereby only receive and store a password blob. Authentication is accomplished by using the same hashing algorithms at the target service to compute
(Continued)

a blob and compare against the synchronized blob. Also described are crypto agility and/or changing hashing algorithms without requiring a user password change.

13 Claims, 8 Drawing Sheets

(51) Int. Cl.
   *H04L 9/32* (2006.01)
   *H04L 9/08* (2006.01)
(52) U.S. Cl.
   CPC .......... *H04L 9/3226* (2013.01); *H04L 63/083* (2013.01); *H04L 63/0823* (2013.01); *H04L 2209/38* (2013.01)
(58) Field of Classification Search
   USPC ...................................... 726/5, 6, 7; 713/182
   See application file for complete search history.

(56) References Cited

U.S. PATENT DOCUMENTS

| | | | |
|---|---|---|---|
| 6,983,377 B1* | 1/2006 | Beesley | G06F 21/31 709/229 |
| 6,986,038 B1 | 1/2006 | Leah et al. | |
| 7,251,732 B2 | 7/2007 | Jamieson et al. | |
| 9,282,093 B2 | 3/2016 | Luk et al. | |
| 2004/0019786 A1* | 1/2004 | Zorn | H04L 9/3273 713/168 |
| 2004/0117666 A1* | 6/2004 | Lavender | G06F 21/31 726/6 |
| 2008/0235772 A1 | 9/2008 | Janzen | |
| 2011/0099616 A1 | 4/2011 | Mazur et al. | |
| 2011/0099618 A1* | 4/2011 | Mutt | G06F 21/41 726/8 |
| 2013/0080765 A1* | 3/2013 | Mohanty | H04L 63/0428 713/150 |
| 2013/0124292 A1* | 5/2013 | Juthani | G06F 21/41 705/14.26 |

OTHER PUBLICATIONS

"International Search Report & Written Opinion Issued in PCT Patent Application No. PCT/US2014/036004", Mailed Date: Sep. 4, 2014, 10 Pages.
"Second Written Opinion Issued in PCT Patent Application No. PCT/US2014/036004", Mailed Date: Mar. 24, 2015, 7 Pages.
"International Preliminary Report on Patentability Issued in PCT Application No. PCT/US2014/036004", Mailed Date: Jul. 14, 2015, 12 Pages.
Requirement for Restriction/Election mailed Sep. 12, 2014 for U.S. Appl. No. 13/873,882, Luk et al., entitled "Synchronizing Credential Hashes Between Directory Services," filed Apr. 30, 2013, 6 pages.
Response filed Nov. 11, 2014, in response to Requirement for Restriction/Election mailed Sep. 12, 2014 or U.S. Appl. No. 13/873,882, Luk et al., entitled "Synchronizing Credential Hashes Between Directory Services," filed Apr. 30, 2013, 3 pages.
Office Action mailed Dec. 4, 2014 for U.S. Appl. No. 13/873,882, Luk et al., entitled "Synchronizing Credential Hashes Between Directory Services," filed Apr. 30, 2013, 11 pages.
Response filed Mar. 4, 2015, in response to Office Action mailed Dec. 4, 2014 for U.S. Appl. No. 13/873,882, Luk et al., entitled "Synchronizing Credential Hashes Between Directory Services," filed Apr. 30, 2013, 10 pages.
Notice of Allowance mailed Jun. 19, 2015 for U.S. Appl. No. 13/873,882, Luk et al., entitled "Synchronizing Credential Hashes Between Directory Services," filed Apr. 30, 2013, 10 pages.
Notice of Allowance mailed Oct. 26, 2015 for U.S. Appl. No. 13/873,882, Luk et al., entitled "Synchronizing Credential Hashes Between Directory Services," filed Apr. 30, 2013, 10 pages.
"Office Action and Search Report Issued in Chinese Patent Application No. 201480024568.5", dated Jun. 22, 2017, 14 Pages.

* cited by examiner

SYNCHRONIZING CREDENTIAL HASHES BETWEEN DIRECTORY SERVICES

CROSS-REFERENCE TO RELATED APPLICATIONS

This application is a continuation of U.S. application Ser. No. 13/873,882, filed Apr. 30, 2013. The entirety of which is hereby incorporated by reference herein.

BACKGROUND

More and more organizations are using cloud service applications and resources as opposed to solely using on-premises applications and resources, (where "on-premises" refers to under the control of the organization, regardless of any physical location, in contrast to the cloud). As with on-premises applications and resources, users need credentials to access existing cloud services. Note that some (typically very small) organizations solely use the cloud for their credential-based identity infrastructure and applications, and thus use the cloud to handle credential-based authentication.

Very large organizations run a directory service on-premises (an example of which is Microsoft Corporation's Active Directory® including its domain controller servers) to authenticate users, and for applications to discover user accounts and relationships between accounts. Among other things, this allows such organizations to retain full control of their credential-related data for security purposes, rather than providing the data to the cloud. Large organizations use what (e.g., in an Active Directory® scenario) may be referred to as a federation/federation service, which contains mechanisms for individual users to leverage their on-premises credentials to access resources in the cloud. The credentials are not synchronized; instead, the cloud directs login requests and the like to an on-premises identity infrastructure for authentication, allowing a user to only sign-on once.

However, a federation is relatively very expensive to install and maintain, and thus only large organizations tend to use a federation. Many smaller organizations want to use the same username and password to access on-premises resources and applications as well as cloud resources and applications. Without the federation, however, some way to handle on-premises credentials and cloud credentials is needed.

One solution is to intercept the plaintext user password for transport to a target directory service. The plaintext user password may be replicated to all servers/databases in the identity infrastructure. However, this can be insecure, particularly when the cloud directory service is a target. Moreover, software needs to be configured on each server in the target directory service to capture all user password change events. Among other drawbacks, this is inefficient and inconvenient to maintain.

Many companies do not want to release on-premises credential data to the cloud for security reasons, which creates an authentication problem. One solution is to issue one set of credentials for users to access the cloud applications, and another to set of credentials for users to access the on-premise applications. This is also inefficient and inconvenient to maintain.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards securely synchronizing passwords that are changed at a source location to a target location, so that the same credentials may be used at the source and target location. In one aspect, a hash value that is computed based upon a plaintext password is received, in which the hash value was computed in response to a password change event at a source service. Data that corresponds to the hash value is exported to a target service, to synchronize the new password to the target service for use in identity authentication. The data that corresponds to the hash value may be secondarily hashed into a password protected blob using a secondary hash algorithm.

In one aspect, a synchronization host process is coupled to a domain mesh. The synchronization host process is configured to synchronize password changes received in the domain mesh with a target directory service external to the mesh, (e.g., a cloud directory service). The synchronization host process obtains a hash value representative of a plaintext password from the domain mesh, processes the hash value into a secret-protected blob via at least one secondary hash algorithm, exports the secret-protected blob to the target directory service. The synchronization host process may be coupled to and obtain the hash value from a component of the mesh or coupled to the mesh, in which the component is configured to receive replicated password change data corresponding to a password change made at any domain controller of the mesh.

In one aspect, a plurality of sets of data comprising protected blobs corresponding to plaintext passwords is maintained. Each blob is associated with an identity, in which the blobs are computed from a plaintext password by at least two hashing algorithms. Another blob that is computed with another hashing algorithm is associated with an identity, including by replacing the blob with the other blob. This may be accomplished by computing the blob with the other hashing algorithm for each identity, including for each identity, hashing the blob associated with that identity into the other blob for that identity. This also may be accomplished by receiving the other blob from an on-premises directory service component, and receiving information that identifies information corresponding to the other hashing algorithm.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a password synchronization technology that allows a single set of credentials to be used for both on-premises resource access and cloud resource access. As will be understood, the technology provides a solution that is relatively straightforward to install and maintain on-premises, while at the same time being secure.

In one aspect, a synchronization agent performs the synchronization operations from an on-premises directory service with a cloud directory service. In one implementation, the synchronization agent may be added to a domain controller mesh as a single component (e.g., running on a single machine joined to a domain) as opposed to running on each domain controller in the domain mesh.

In one aspect, credentials maintained in the on-premises directory service are synchronized with the cloud directory service by first using one or more hash algorithms to hash the passwords. A primary hash is used, and may be used in combination with at least one secondary hash. The plaintext passwords are never sent to the cloud.

In one aspect, the technology supports having the on-premises system switch to a new primary hash algorithm, without requiring users to change their existing passwords or otherwise recapture the users' plaintext passwords. Further, if the secondary hash algorithm is compromised or a more secure secondary hash algorithm otherwise becomes desirable to use, the secondary hash algorithm may be changed without requiring users to change their existing passwords or otherwise recapture the users' plaintext passwords.

It should be understood that any of the examples herein are non-limiting. For instance, many of the examples herein are generally described in a directory service environment such as Active Directory®; however any similar identity infrastructure/environment may benefit from the technology described herein. Moreover, while the examples are directed towards secure credential synchronization, other types of data that needs to be securely synchronized may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in data synchronization, data security and/or cloud services in general.

Figure 1:
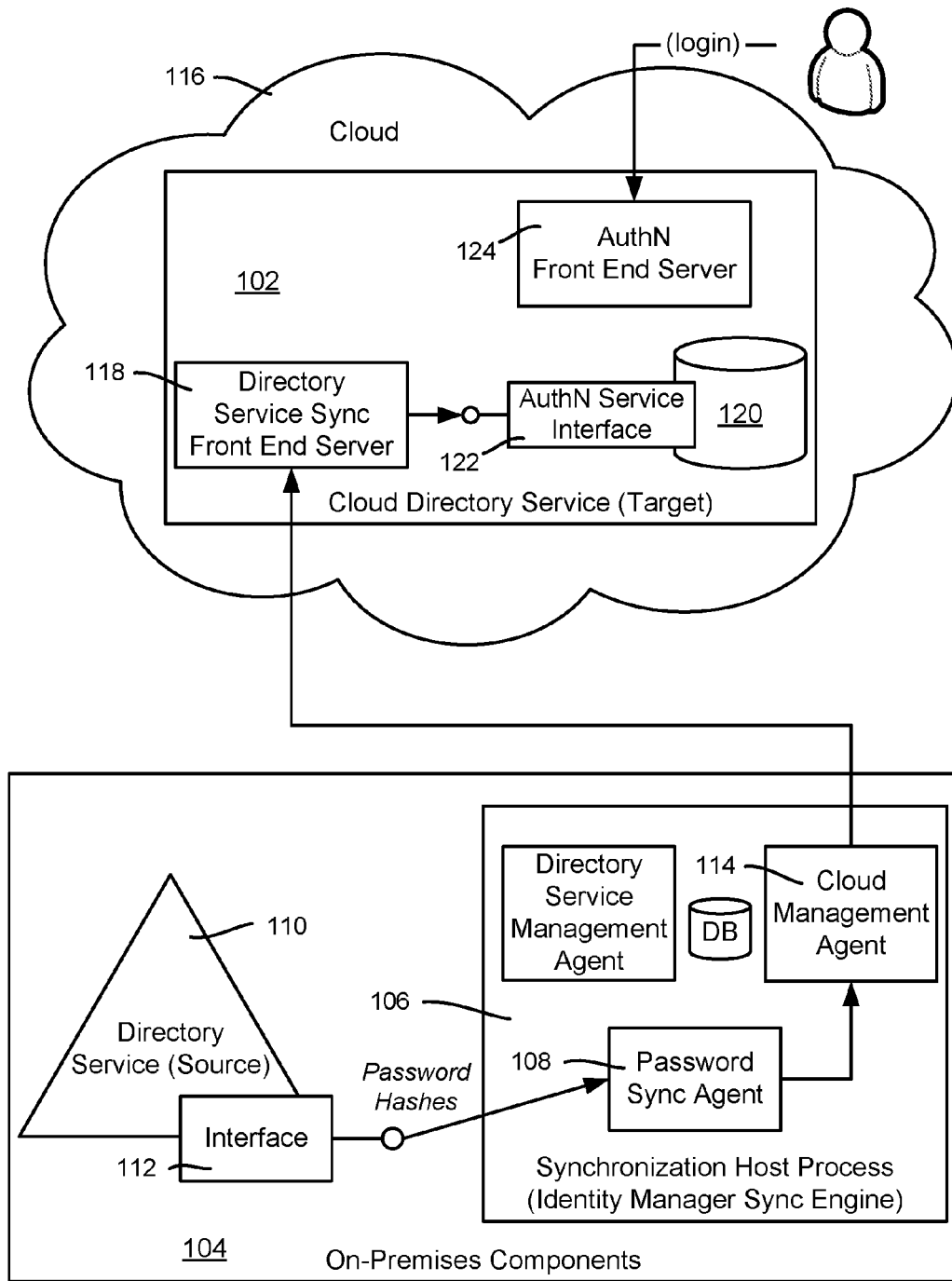
FIG. 1 is a block diagram representing example components configured to synchronize password changes made at an on-premises directory service to a cloud directory service, according to one example implementation.

FIG. 1 is a block diagram showing example components that may be used for securely synchronizing data including credential data from on-premises components to a cloud directory service 102. On-premises components 104 include a synchronization host process 106 (e.g., an identity manager synchronization engine) that includes a password synchronization agent 108. In general, the synchronization host process 106 comprises a process that actively drives the retrieval and export of credentials from a source directory service 110.

In one implementation, synchronization is accomplished via the password synchronization agent 108, which calls into the on-premises (local) directory service 108 (the source directory) via a suitable interface 112 to obtain credential-related data, which as described below, comprise hashed passwords. So as to obtain only the changed hashed passwords (deltas) since the last synchronization time, the call may provide a synchronization timestamp. For example, Active Directory® has a publicly documented API (IDL_DRSGetNCChanges) that when called retrieves and returns a list of changes since a provided timestamp, which is the last synchronization time provided by the password synchronization agent 108. In a scenario in which the change data comprises more than password-related data, the synchronization agent 108 parses/filters the returned data to determine the set of updated credentials since the last synchronization time.

The set of changed credentials are returned to the password synchronization agent 108 as a set of hashed credentials. In one implementation, these hashes are not persisted by the synchronization host process 106 or the password synchronization agent 108, and are only temporarily used in the attempt to synchronize the credential hash to a target directory service, e.g., the cloud directory service 102 in FIG. 1. In one implementation, the on-premises password hashes are secondarily hashed using a randomly generated (salt) value and number of iterations before being sent to the target (cloud) directory service 102.

In one implementation, the password synchronization agent 108 attempts to synchronize only the credentials of in-scope identities (where scope is a well-known concept in identity infrastructures) to the target directory service 102. Credentials that belong to out-of-scope identities are not synchronized to the target directory service 102. Further, credentials that belong to identities that have not been provisioned to the target directory service 102 are also not synchronized; instead they may be synchronized at a later time when that identity has been successfully provisioned in the target directory service 102.

In FIG. 1, a target directory connector component represented as a cloud management agent 114 is responsible for handling the export of the hashed credential to the cloud 116. To this end, a cloud front end component 118 (e.g., directory service sync front end server) receives the request to update the credential, and then attempts to persist the hashed credential in the target directory service storage system 120 through a (e.g., private) programmatic interface 122. If the credential hash is successfully persisted in the target directory service, a success status is returned to the front end component 118 and the front end component 118 returns a success status to the synchronization host process 106. Upon receipt of a "success" response, the synchronization host process 106 considers the credential successfully synchronized to the target directory service 102. If a failure response is encountered, the export may be queued up for retry at a later time.

Figure 2:
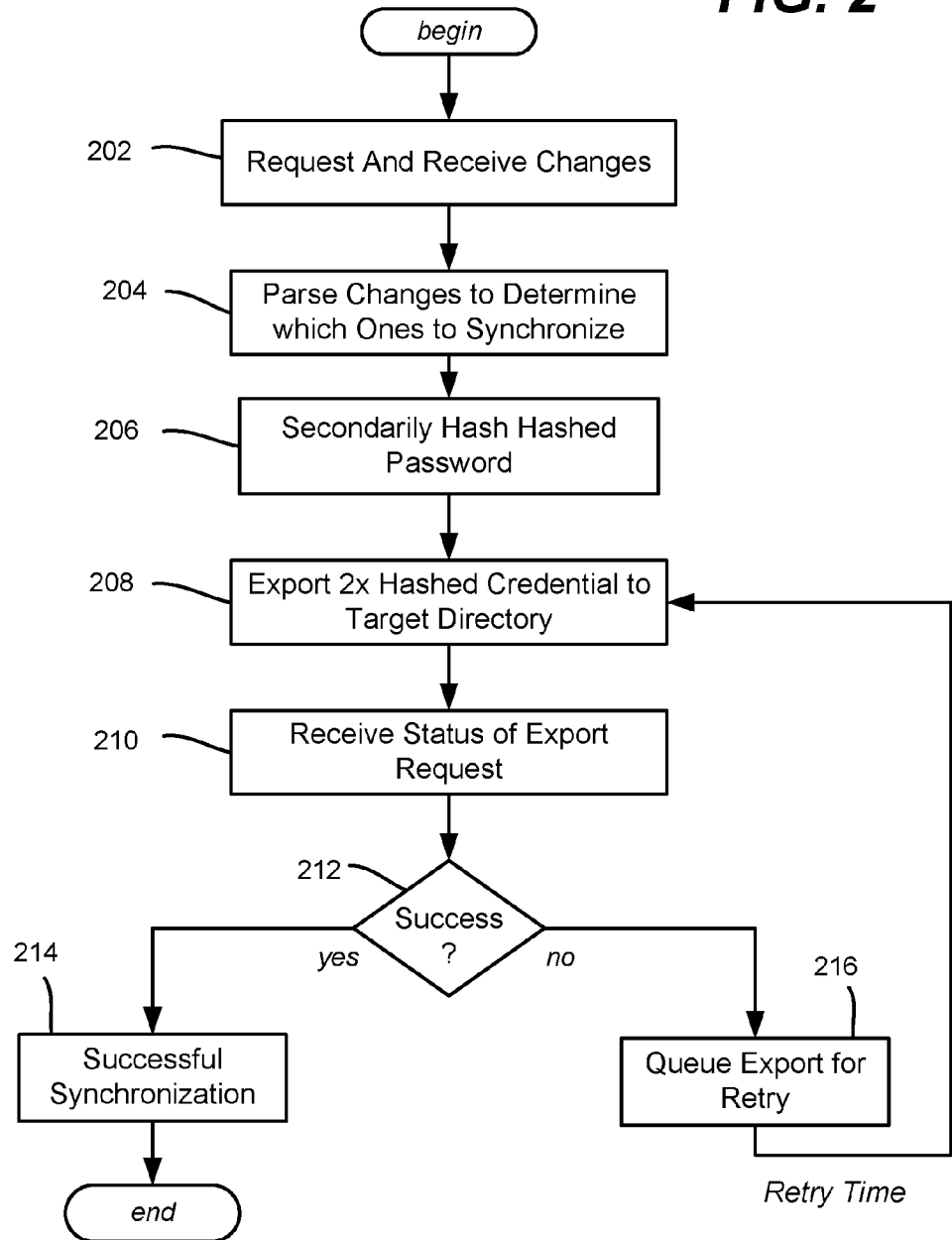
FIG. 2 is a flow diagram representing example steps that may be taken in securely synchronizing a password change at a source directory service to a target directory service, according to one example implementation

FIG. 2 shows the above operation as a set of example steps. Some of the steps are shown for a single credential, however as can be readily appreciated, credential synchronization may be batched, and/or some or all of the steps may be performed in parallel.

At step 202, the password synchronization agent 108 (FIG. 1) requests and receives the changes (since a given timestamp) from the source directory service 110. The request is made at a synchronization time, which may be periodic or otherwise. As described above, the passwords are hashed with a primary hash function, e.g., Ha(password), such as MD4(password).

Upon receiving the changes, as represented by step 204, the password synchronization agent 108 parses the changes to determine which ones are to be synchronized, e.g., are password changes of in-scope, provisioned identities. As mentioned above, consider that only one credential is being dealt with at this time.

Step 206 represents secondarily hashing the hashed password, e.g., H1(Ha(password)) such as SHA256(MD4(password)). Secondary hashing is further described below.

Step 208 exports the hashed credential to the target directory service 102, which attempts to persist it. Step 210 receives the result of the export request as a returned status; if a success is received as evaluated at step 212, the credential was successfully synchronized to the target directory service (step 214) and the process ends. If a failure is detected via step 212, the export is queued up for retry at a later time, as represented by step 216.

Figure 3:
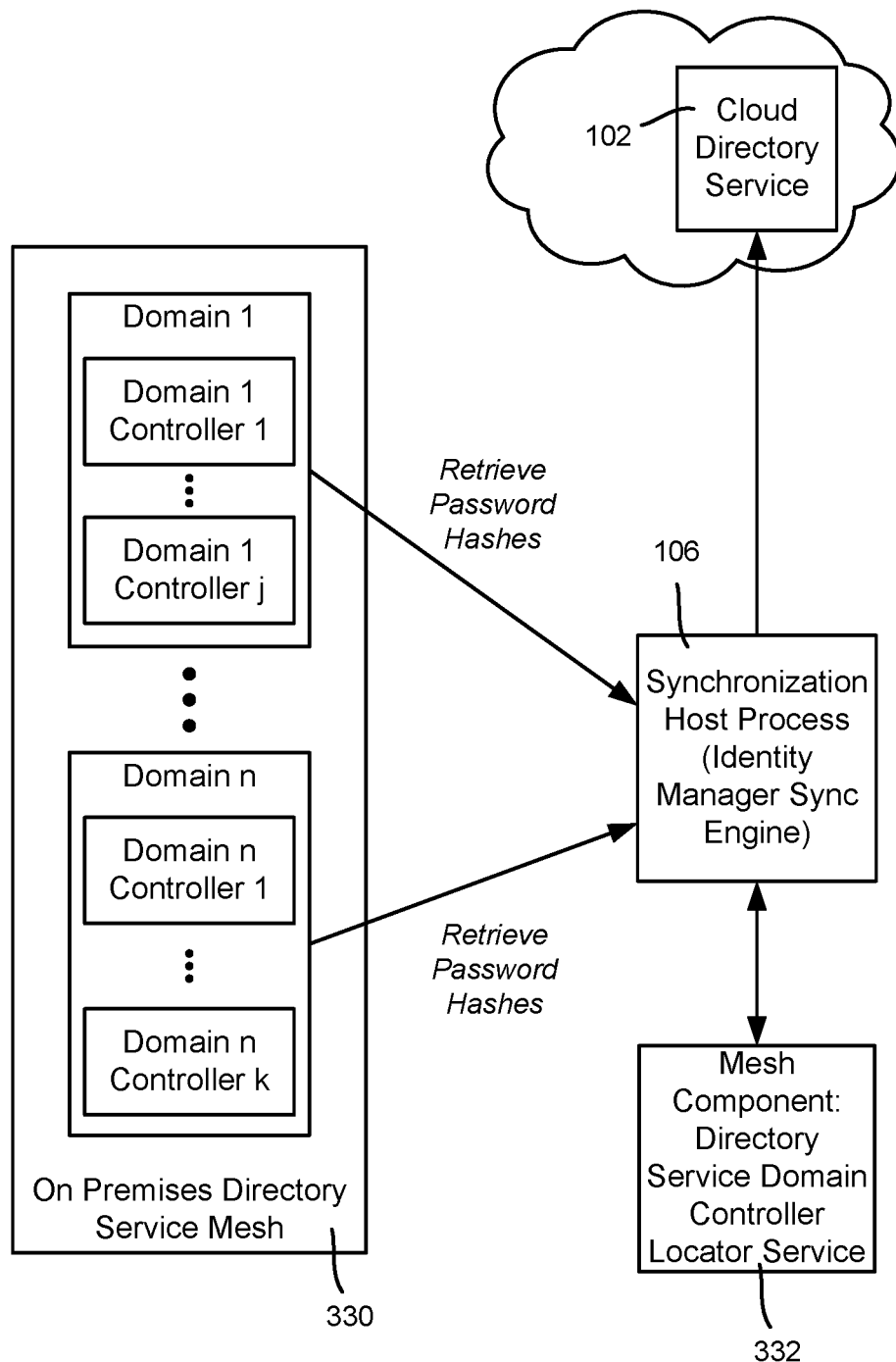
FIG. 3 is a block diagram representing example components configured to synchronize on-premises directory service password changes made at any domain controller to a cloud directory service via a single component, according to one example implementation.

As generally represented in FIG. 3, the on-premises domain mesh 330 contains Domain 1 (having domain 1 controller 1—domain 1 controller j) through Domain n (having domain n controller 1—domain n controller k). In one aspect, the mesh may add (e.g., may be joined by or otherwise coupled to) a component running on machine or the like that runs as a directory service domain controller locator service 332. As is known, password changes are made at one domain controller (e.g., the closest to the user, although other schemes are feasible) and replicated to other domain controllers of the domain. As described herein, the changed passwords hashed with the primary hash are replicated rather than the plaintext passwords.

The synchronization host process 106 contacts the directory service domain controller locator service 332 to determine a domain controller instance from which to retrieve the credential change data. For example, there may be one domain controller identified in each domain to provide the changes to the synchronization host process 106. In this way, the existing replication scheme of a mesh may be leveraged to perform password change synchronization with the cloud service; (note that this is in contrast to existing systems in which components/code extension DLLs need to be registered with all machines associated with the source directory/mesh in order to ensure that all credential changes are captured and synchronized to the target directory).

Figure 4:
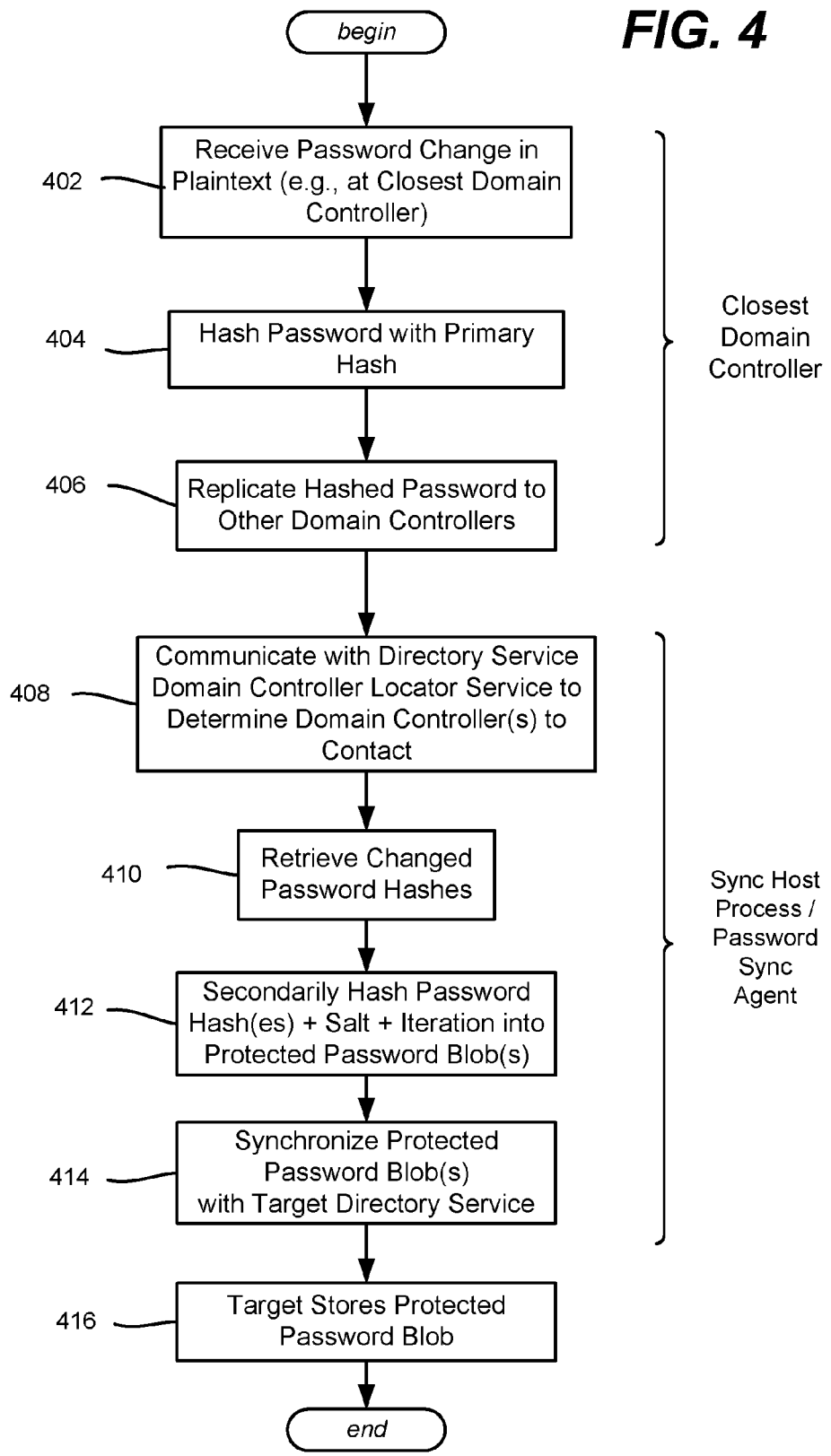
FIG. 4 is a flow diagram representing example steps that may be taken to throughout a secure password synchronization operation, according to one example implementation.

FIG. 4 summarizes example steps related to the implementation of FIG. 3 and domain controller operations in general. Step 402 represents receiving a password change in plaintext, which is typically at the closest domain controller to the user (although other schemes, such as based upon load balancing, are feasible). Step 404 represents the password being hashed at that domain controller with the primary hash, e.g., Ha(Password). Step 406 represents replicating the hashed password to the other domain controllers Step 408 represents the synchronization host process 106 communicating with the directory service domain controller locator service 332 to determine which domain controller(s) to contact for the change data. In general, one domain controller from each domain is identified by the domain controller locator service 332 to the synchronization host process 106.

Step 410 represents the password synchronization agent retrieving the changed password hashes from a directory service domain controller. Note that as an alternative, the changes may be pushed to the password synchronization agent for synchronization on demand or on some other schedule. It is feasible for the synchronization host process to run on the same machine as the directory service domain controller locator service 332, although as described above, the synchronization host process does not persist the hashed passwords other than as needed to perform the synchronization with the target service.

Although it is feasible for the target to be synchronized with and store the hashed password, having secondary hashing provides a number of benefits as described herein. Step 412 represents the secondary hashing, e.g., H1(Ha(password)). In one aspect, the secondary hashing generates protected password blob which includes the hashing algorithm name and version, plus random salt, an iteration count plus digest. The result of this secondary hashing is synchronized with (step 414) and stored (step 416) at the target directory service. Note that the cloud also may perform such secondary hashing, such as to hash yet again before storage.

Turning to login aspects, when an identity attempts to access a service or software associated with the target directory service, e.g., via AuthN front end server 124 (FIG. 1) if the credential is marked as "synchronized from source directory" in the authentication platform of the target directory service, the authentication platform understands to execute the appropriate login verification procedure and compare the credential presented by the identity against the credential hash synchronized from the source directory.

The target authentication platform is instructed to use an algorithm to match the on-premises hashing algorithm, but this may be any one algorithm or set of algorithms. This facilitates a number of scenarios, including crypto agility. In general, crypto agility allows for multiple hashing algorithms to be used, and/or combinations of hashing algorithms. As a result, the primary hashing algorithm can change over time, the secondary hashing algorithm can change over time, algorithms of different (e.g., third party) services may be used, and so on.

Figure 5:
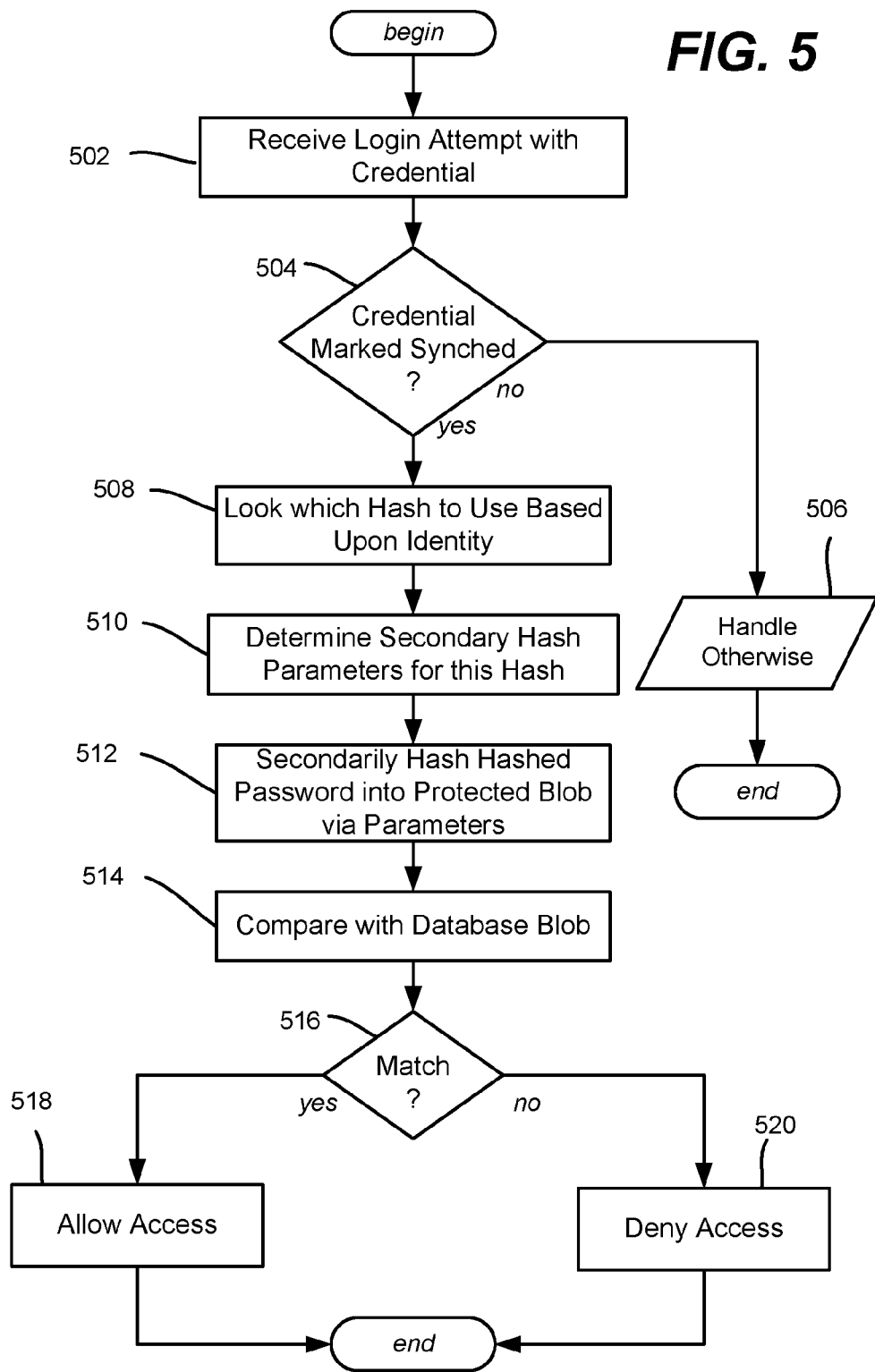
FIG. 5 is a flow diagram representing example steps that may be taken to authenticate a user during a logon attempt using securely synchronized password-related data, according to one example implementation.

FIG. 5 shows some example steps related to logon operations at the cloud service, beginning at step 502 where a logon attempt with a credential is received. If at step 504 the credential is not marked as "synchronized from source directory" or the like, then for example the cloud is being accessed by a user that is not part of an on-premises directory service, such as a user of a very small organization that solely uses the cloud for authentication and resource access. Also, users may be part of the on-premises directory service but not using the technology described herein, and thus the credential is not marked synchronized If so, step 506 handles this request otherwise, e.g., via conventional cloud logon.

If instead step 504 detects that the credential is marked as "synchronized from source directory," step 508 looks up which hashing algorithm/data to use, e.g., based upon the user identity. Step 510 determines the parameters for this hash, e.g., salt and iterations. Note that in a scenario in which only one hashing algorithm exists, steps 508 and 510 are not needed, but as can be readily appreciated, these steps provide for crypto agility.

Step 512 converts the logon password data into the protected password blob, which step 514 compares against the blob stored on the target service's database. If there is a match (step 516), access is allowed via step 518, otherwise access is denied via step 520.

Note that crypto-agility supports a new on-premises (primary) hashing algorithm (Ha) without impacting the service and without having to recapture user's plaintext password. For example, consider that the on-premises system switches from Ha to Hb (e.g. the next version of the directory service deprecates MD4 in favor of something more modern). Any new passwords/changed passwords will be computed and synchronized as (H1(Hb(password))). At logon time, when users type their username and (plaintext) password, the system determines whether (H1(Ha)) or (H1(Hb)) is present in the database, and applies the appropriate one to the plaintext password for comparison.

Further, the authentication platform can perform additional hashing of stored hashes as desired. This facilitates time-resistant data protection of at rest passwords with crypto agility. By way of example, consider that the secondary hashing algorithm (H1) is compromised, that is, no longer deemed sufficiently secure. The H1 hashing algorithm may be effectively replaced, without having to re-capture user's clear-text password.

Figure 6:
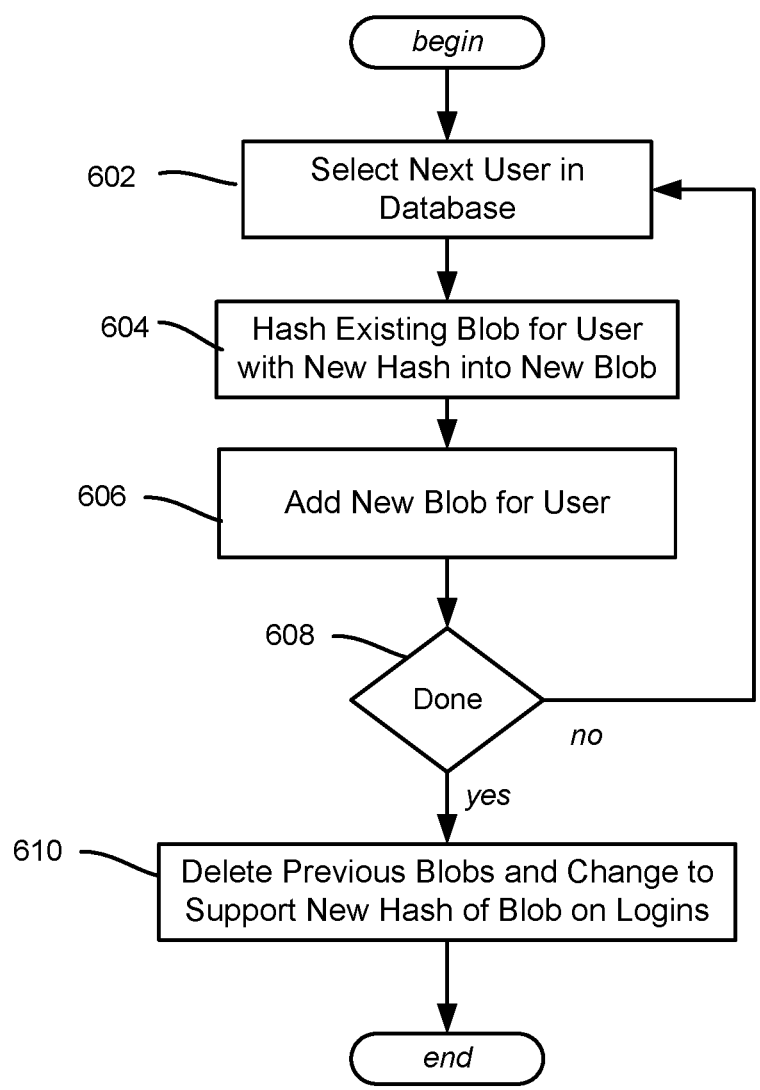
FIG. 6 is a flow diagram representing example steps that may be taken to change a secondary hashing algorithm and password-related data maintained for a set of users, according to one example implementation.

By way of example, consider that the currently computed and stored data blob is H1(Ha(password)). For security, a new secondary hashing algorithm (H2) is introduced. As represented at steps 602, 604 and 606 of FIG. 6, for each user, the target system parses the entire database, computes (H2(H1(Ha(password))), and stores the new value. When the parsing is complete as evaluated by step 608, the system deletes the (H1(Ha(password))) for all user at step 610 and switches to use the (H2(H1)) algorithm. Thus, the target system no longer stores the comprised hash at rest. Note that it is feasible to replace the existing blob at step 606, however if the parsing process is lengthy, users may be prevented from logging on until the parsing process is complete.

At logon time, everything works the same as before from the user's perspective. As the user logs in, the target determines that (H2(H1(Ha))) is the hashing algorithm to compute the hash value for the provided password and compare the hash value to what is stored.

The target system also may switch to another hash function for new passwords. For example, consider that another hashing algorithm H3 is developed that is deemed superior in some way to the existing one, e.g., H3 is much better and/or faster than H1. In this example the change is not a security issue, and thus the (H1(Ha(password))) is safe, and left intact. The synchronization host process (and the target service) is updated to support (H3) for any new users/changed passwords. Users that change their password are thus synchronized using (H3(Ha(password))). Users that have not changed their passwords continue to be authenticated via the (H1(Ha(password))) algorithm.

Password history may be maintained in the cloud service and used at logon time to avoid locking users out. For example, consider a user who has changed his or her password on one device, resulting in synchronizing a blob to the cloud service, but has not changed the password on another device. The other device may regularly communicate with the login service with the previous password, which may cause problems. To avoid this issue, the user-provided clear-text password may be compared against the existing blob(s) stored as "current password," and if none match, compared against the blob(s) stored as "previous password." Any desired number of previous sets of one or more password blob(s) may be maintained, e.g., the current password plus the last two passwords may also work, and so on.

Further, password history restrictions may be enforced with the hashing at rest, e.g., for users who do not change their passwords on-premises. For example, consider a policy where users are not allowed to reuse any of their five previous passwords. The cloud service stores the latest password blob, such as (H3(Ha(password_current))), as well as password history, such as (H3(Ha(password_previous))); (H1 (Ha(password_previous2))); (H2((H1(Ha (password_previous3))) and so on up to the policy limit. Note that these blobs need not have been generated with the same hashing algorithm. Indeed, some of them may have been re-hashed if the original hash was found to be insecure or was otherwise changed.

At password change time, when the new password is collected, the service looks up the list of algorithms in the password history field, computes the corresponding hashes, and compares them to the stored digests to determine whether the change is allowed.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
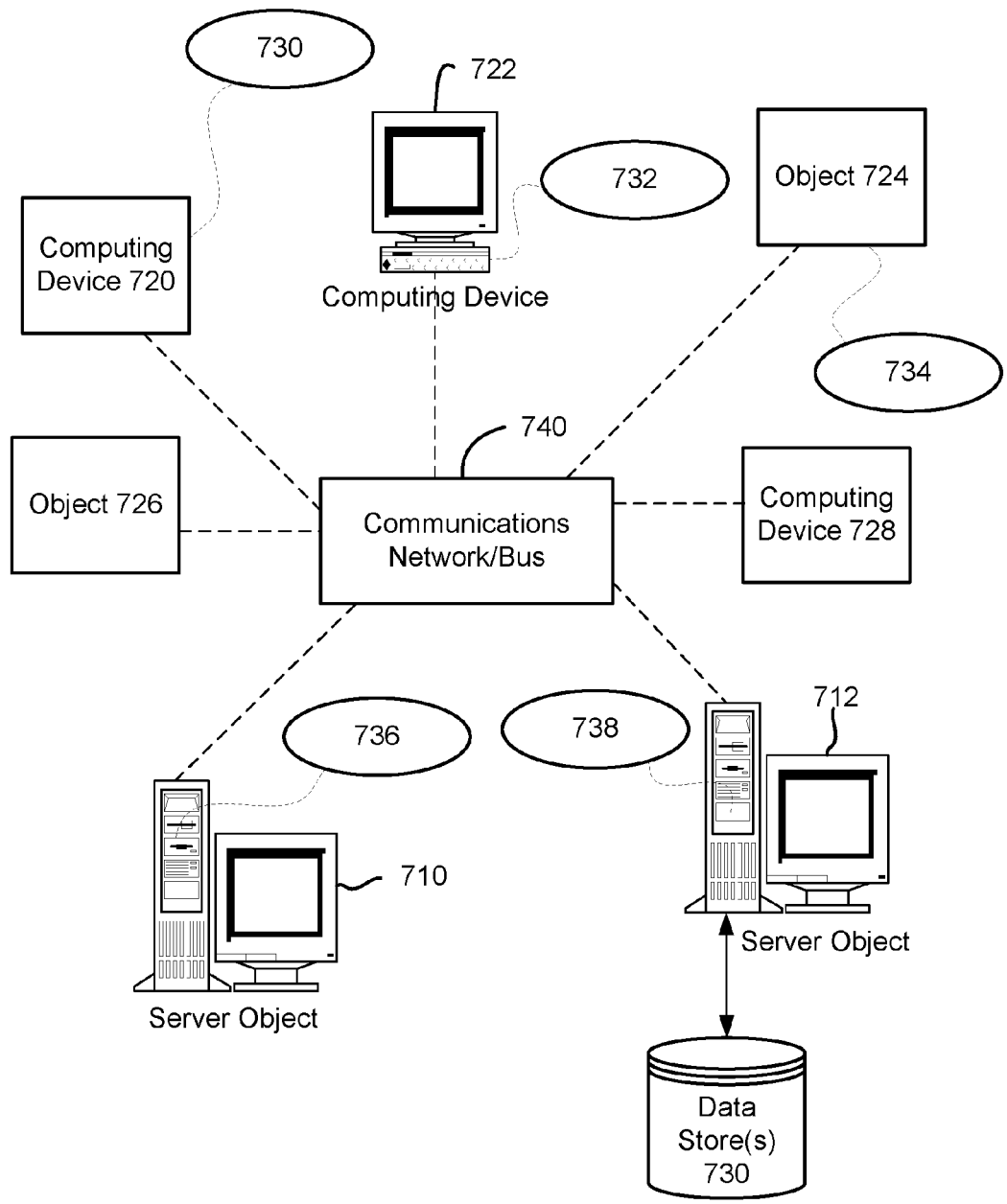
FIG. 7 is a block diagram representing exemplary non-limiting networked environments in which various embodiments described herein can be implemented.

FIG. 7 provides a schematic diagram of an exemplary networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
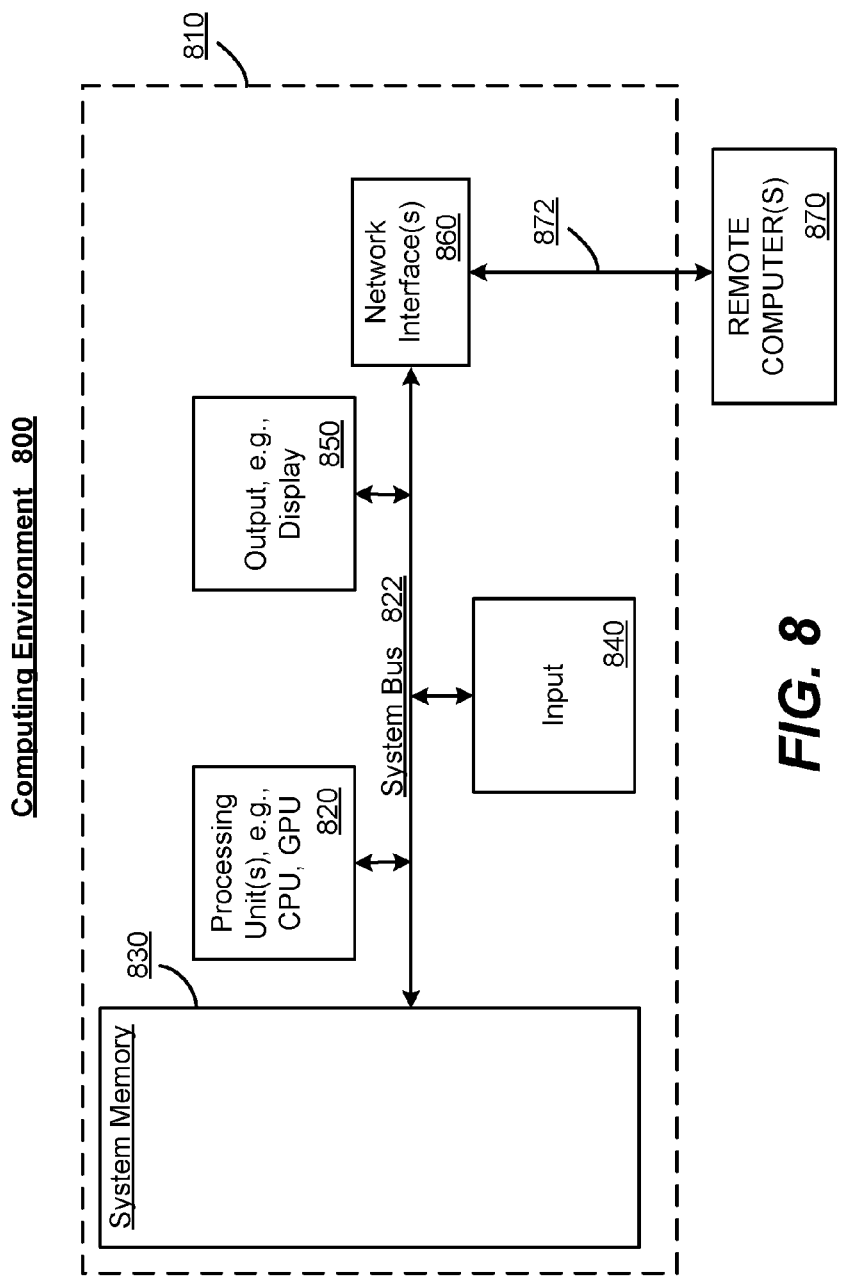
FIG. 8 is a block diagram representing an exemplary non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method for synchronizing a set of password credentials between a source service and a target service, the set of password credentials enabling access to the source service and the target service, the method comprising:

receiving, by a hardware processor, at the target service, a hashed set of password credentials, the hashed set of password credentials including only changes made to the set of password credentials since a last password credential synchronization between the source service and the target service, the hashed set of password credentials computed in response to a password change event at the source service; and using the hashed set of password credentials, synchronizing security authentication data that corresponds to last synchronized password credentials, with the received hashed set of password credentials, at the target service; and performing identity authentication, using the synchronized security authentication data, to enable access to the target service.

2. The method of claim 1, wherein the received hashed set of password credentials is hashed with a primary hashing algorithm, and the hashed set of password credentials is secondarily hashed into secret-protected data using a secondary hash algorithm that corresponds to the hashed set of password credentials.

3. The method of claim 2, wherein the secondary hashing includes using random salt and a number of iterations.

4. The method of claim 1, wherein receiving the hashed set of password credentials includes requesting change data from a directory service.

5. The method of claim 4, further comprising:
parsing the change data into password change data comprising the hashed set of password credentials.

6. The method of claim 1, further comprising:
sending a status value in response to receiving the hashed set of password credentials.

7. The method of claim 1 wherein:
receiving the hashed set of password credentials at the target service includes receiving information that identifies which of a plurality of secondary hashing algorithms to use when authenticating an identity corresponding to the hashed set of password credentials.

8. The method of claim 1, further comprising:
further hashing the hashed set of password credentials with at least one further hash function at the target service for storing as secret-protected data.

9. A method comprising:
synchronizing a set of password credentials between a source service and a target service, the set of password credentials enabling access to the source service and the target service, the synchronizing including:
receiving, at a target service, a hashed set of password credentials, the hashed set of password credentials including only changes made to the set of password credentials since a last password credential synchronization between the source service and the target service, the hashed set of password credentials computed in response to a password change event at the source service, and
storing, at the target service, a plurality of sets of data comprising protected password data corresponding to plaintext passwords, the protected password data associated with a respective identity, wherein the protected password data is hashed from a plaintext password by a combination of at least two hashing algorithms and included in the received hashed set of password credentials; and
receiving, at the target service, a login attempt including a credential corresponding to an identity and a password; and
authenticating the identity, at the target service, the authenticating including:
computing a first value based upon performing at least one hashing algorithm on the password; and
comparing the first value with protected password data associated with the identity.

10. The method of claim 9, further comprising:
replacing data associated with an identity with data computed from at least one different hashing algorithm.

11. The method of claim 9, further comprising:
adding new data in association with an identity, in which the new data is computed from at least one different hashing algorithm.

12. The method of claim 9, further comprising:
maintaining current data and a history comprising at least one previous set of data in association with an identity, and wherein comparing the first value with the protected password data associated with the identity to authenticate the identity comprises using the history.

13. The method of claim 9, further comprising:
receiving, at the target service, an indication that an on-premises directory service is using a different primary hashing algorithm.

* * * * *